(12) United States Patent
Morcos et al.

(10) Patent No.: US 11,537,856 B2
(45) Date of Patent: Dec. 27, 2022

(54) DIGITAL CIRCUITS FOR EVALUATING NEURAL ENGINEERING FRAMEWORK STYLE NEURAL NETWORKS

(71) Applicant: Applied Brain Research Inc., Waterloo (CA)

(72) Inventors: Benjamin Jacob Morcos, Waterloo (CA); Christopher David Eliasmith, Waterloo (CA); Nachiket Ganesh Kapre, Waterloo (CA)

(73) Assignee: APPLIED BRAIN RESEARCH INC., Waterloo (CA)

(*) Notice: Subject to any disclaimer, the term of this patent is extended or adjusted under 35 U.S.C. 154(b) by 722 days.

(21) Appl. No.: 16/536,004

(22) Filed: Aug. 8, 2019

(65) Prior Publication Data

US 2020/0050926 A1 Feb. 13, 2020

Related U.S. Application Data

(60) Provisional application No. 62/716,164, filed on Aug. 8, 2018.

(51) Int. Cl.
*G06F 17/16* (2006.01)
*G06N 3/063* (2006.01)
*G06N 3/08* (2006.01)

(52) U.S. Cl.
CPC ............ *G06N 3/063* (2013.01); *G06F 17/16* (2013.01); *G06N 3/08* (2013.01)

(58) Field of Classification Search
CPC ........... G06N 3/063; G06N 3/08; G06F 17/15
See application file for complete search history.

(56) References Cited

U.S. PATENT DOCUMENTS 9,367,788 B2 6/2016 Juivalainen
9,367,798 B2 6/2016 Coenen et al.
(Continued)

OTHER PUBLICATIONS

Bekolay et al., "Simultaneous Unsupervised and Supervised Learning of Cognitive Functions in Biologically Plausible Spiking Neural Networks" 35th Annual Conference of the Cognitive Science Society, 2013, pp. 169-174.
Berzish et al., "Real-Time FPGA Simulation of Surrogate Models of Large Spiking Networks", Lecture Notes in Computer Science, 2016, pp. 349-356.
Blouw et al., "Benchmarking Keyword Spotting Efficiency on Neuromorphic Hardware", 2018, pp. 1-8.
(Continued)

*Primary Examiner* — Cheng Yuan Tseng
(74) *Attorney, Agent, or Firm* — Elan IP Inc.

(57) ABSTRACT

The present invention relates to the digital circuits for evaluating neural engineering framework style neural networks. The digital circuits for evaluating neural engineering framework style neural networks comprised of at least one on-chip memory, a plurality of non-linear components, an external system, a first spatially parallel matrix multiplication, a second spatially parallel matrix multiplication, an error signal, plurality of set of factorized network weight, and an input signal. The plurality of sets of factorized network weights further comprise a first set factorized network weights and a second set of factorized network weights. The first spatially parallel matrix multiplication combines the input signal with the first set of factorized network weights called the encoder weight matrix to produce an encoded value. The non-linear components are hardware simulated neurons which accept said encoded value to produce a distributed neural activity. The second spatially parallel matrix multiplication combines said distributed neural activity with said second set of factorized network weights called the decoder weight matrix to produce an output signal.

11 Claims, 2 Drawing Sheets

(56) References Cited

U.S. PATENT DOCUMENTS

| | | | |
|---|---|---|---|
| 11,238,337 B2* | 2/2022 | Voelker | G06N 3/08 |
| 2014/0156577 A1 | 6/2014 | Eliasmith | |
| 2015/0206050 A1* | 7/2015 | Talathi | G06N 3/08 |
| | | | 706/15 |
| 2016/0147201 A1* | 5/2016 | Crncich-DeWolf | G06N 3/08 |
| | | | 700/47 |
| 2017/0270073 A1* | 9/2017 | Badin | G06N 3/063 |
| 2019/0244095 A1* | 8/2019 | Huang | G06F 9/5011 |
| 2019/0294413 A1* | 9/2019 | Vantrease | G06F 7/5095 |
| 2019/0349318 A1* | 11/2019 | Fok | H04L 45/74 |
| 2020/0019839 A1* | 1/2020 | Boahen | G06F 17/16 |
| 2020/0118001 A1* | 4/2020 | Boybat Kara | G06N 3/084 |
| 2020/0193297 A1* | 6/2020 | Verhoef | G06N 20/10 |
| 2022/0140967 A1* | 5/2022 | Khoryaev | H04W 4/46 |
| | | | 375/220 |

OTHER PUBLICATIONS

Bekolay, Trevor & Koibeck, Carter & Eliasmith, Chris. (2013). Simultaneous unsupervised and supervised learning of cognitive functions in biologically plausible spiking neural networks. 169-174.

Berzish, M., Eliasmith, C., Tripp, B. (2016). Real-Time FPGA Simulation of Surrogate Models of Large Spiking Networks. In: Villa, A., Masulli, P., Pons Rivero, A. (eds) Artificial Neural Networks and Machine Learning—ICANN 2016. ICANN 2016. Lecture Notes in Computer Science(), vol. 9886. Springer, Cham. https://doi.org/10.1007/978-3-319-44778-0_41.

Blouw, Peter et al. "Benchmarking Keyword Spotting Efficiency on Neuromorphic Hardware." ArXiv abs/1812.01739(2019): n. pag.

* cited by examiner

DIGITAL CIRCUITS FOR EVALUATING NEURAL ENGINEERING FRAMEWORK STYLE NEURAL NETWORKS

(1) FIELD OF THE INVENTION

The present invention generally relates to the field of digital circuits and more particularly to digital circuits for evaluating neural engineering framework style neural networks.

(2) BACKGROUND OF THE INVENTION

As Moore's law and Dennard scaling begin to breakdown, the semiconductor industry faces increasing technical and physical challenges in the manufacturing and fabrication of viable chips that continue to improve upon state-of-the-art performance. Simultaneously, the machine learning revolution is creating a need for more powerful processing hardware that can train and evaluate sophisticated neural networks. To address the high compute demand, machine learning developers have embraced GPUs for training and inference. This has been made possible by the availability of optimized GPU libraries, high-level CUDA or OpenCL programming environments, and ease of integration with Python.

A number of different types of circuits for the neural engineering framework are have been disclosed in the prior art. For example, the following patents are provided for their supportive teachings and are all incorporated by reference: Prior art document, US,2014,015,65,77 discloses methods, systems and apparatus that provide for perceptual, cognitive, and motor behaviors in an integrated system implemented using neural architectures. Components of the system communicate using artificial neurons that implement neural networks. The connections between these networks form representations—referred to as semantic pointers—which model the various firing patterns of biological neural network connections. Semantic pointers can be thought of as elements of a neural vector space and can implement a form of abstraction level filtering or compression, in which high-dimensional structures can be abstracted one or more times thereby reducing the number of dimensions needed to represent a particular structure.

U.S. Pat. No. 9,367,798 discloses an adaptive controller apparatus of a plant. The controller may comprise an encoder block and a control block. The encoder may utilize basis function kernel expansion techniques to encode an arbitrary combination of inputs into spike outputs. The controller includes spiking neuron networks operable according to reinforcement learning processes. The network may receive the encoder output via a plurality of plastic connections. The process may be configured to adaptively modify connection weights in order to maximize process performance, associated with a target outcome. The relevant features of the input may be identified and used for enabling the controlled plant to achieve the target outcome.

However, above mentioned references and many other similar references have several shortcomings, which the present invention aims to address.

(3) SUMMARY OF THE INVENTION

In the view of the foregoing disadvantages inherent in the known types of NEF implementation on digital or analog circuit present in the prior art, the present invention provides digital circuits for evaluating weight factorized neural engineering framework style neural network models in hardware.

The main aspect of the present invention is to provide digital circuits for evaluating neural engineering framework style neural networks. The digital circuits for evaluating neural engineering framework style neural networks include at least one on-chip memory, a plurality of non-linear components, an external system, a first spatially parallel matrix multiplication, a second spatially parallel matrix multiplication, an error signal, plurality of sets of factorized network weights, and an input signal. The plurality of sets of factorized network weights further include a first set factorized network weights and a second set of factorized network weights. A first spatially parallel matrix multiplication combines the input signal with the first set of factorized network weights called an encoder weight matrix to produce an encoded value. The non-linear components are hardware simulated neurons which accept the encoded value to produce a distributed neural activity. The second spatially parallel matrix multiplication combines the distributed neural activity with the second set of factorized network weights called a decoder weight matrix to produce an output signal.

Another aspect of the present invention is to provide input and output signals which are time-varying signals of arbitrary dimensionality.

Yet another aspect of the present invention is to provide encoder weights which are either randomly generated or explicitly set and are stored in the on-chip memory.

Still another aspect of the present invention is to provide the decoder weight matrix which computes an arbitrary function and is either analytically calculated or trained online and stored in the on-chip memory.

Yet another aspect of the present invention is to provide the input signal and the output signal interacting with an external system in real-time.

Still another aspect of the present invention is to provide neural activity which has N elements, the input signal has $D_{in}$ elements, and the output signal has $D_{out}$ elements; all three of which are run-time parameters.

Yet another aspect of the present invention is to provide the plurality of sets of factorized network weights loaded upon initialization of digital circuits for evaluating neural engineering framework style neural networks.

Still another aspect of the present invention is the initialization of loading on digital circuits for evaluating neural engineering framework style neural networks occurs once per application.

Yet another aspect of the present invention is to provide the decoder weights matrix which may be trained online using an error signal scaled by the neural activity to produce an update to the decoder weights matrix.

Still another aspect of the present invention is to provide the error signal which is produced by the external system calculated based on the input signal and the output signal Yet another aspect of the present invention is to provide the external system as external circuits used to accumulate partial parts of the output signal.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

(4) BRIEF DESCRIPTION OF THE DRAWINGS

The invention will be better understood and objects other than those set forth above will become apparent when consideration is given to the following detailed description thereof. Such description refers to the annexed drawings wherein.

(5) DETAILED DESCRIPTION OF THE INVENTION

Figure 1:
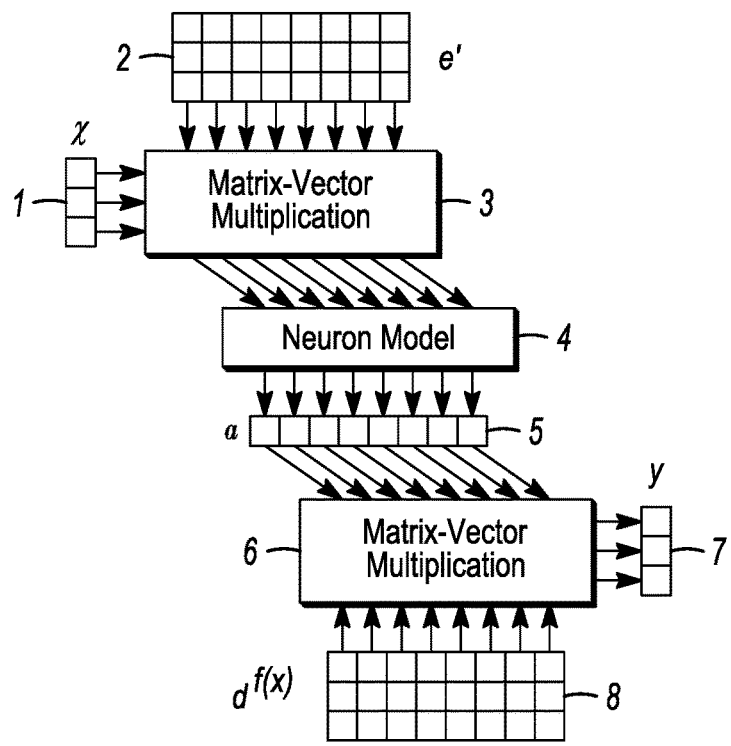
FIG. 1 shows the dataflow of digital circuits for evaluating neural engineering framework style neural networks.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure and are not meant to be limiting in any fashion.

Various modifications of the invention will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the techniques being selectable by the entity implementing this invention. Those of ordinary skill in the art further understand that the exemplary hardware, software, processes, methods, and/or operating systems described herein are for illustrative purposes and, thus, are not intended to be limited to any particular named element.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The embodiments of the digital circuits described herein may be implemented in configurable hardware (i.e. FPGA) or custom hardware (i.e. ASIC), or a combination of both with at least one interface. The input signal is consumed by the digital circuits to perform the functions described herein and to generate the output signal. The output signal is provided to one or more adjacent or surrounding systems or devices in a known fashion.

As used herein the term 'neuron' refers to spiking neurons, continuous rate neurons, or arbitrary non-linear components used to make up a distributed system.

The described systems can be implemented using adaptive or non-adaptive components. The system can be efficiently implemented on a wide variety of distributed systems that include a large number of non-linear components whose individual outputs can be combined together to implement certain aspects of the system as will be described more fully herein below.

The main embodiment of the present invention provides digital circuits for evaluating neural engineering framework style neural networks. FIG. 1 shows the dataflow of digital circuits for evaluating neural engineering framework style neural networks. The digital circuits for evaluating neural engineering framework style neural networks comprise at least one on-chip memory, a plurality of non-linear components, an external system, a first spatially parallel matrix multiplication, a second spatially parallel matrix multiplication, an error signal, a plurality of sets of factorized network weights, and an input signal. The plurality of sets of factorized network weights further comprise a first set factorized network weights and a second set of factorized network weights. The first spatially parallel matrix multiplication combines the input signal with the first set of factorized network weights called an encoder weight matrix to produce an encoded value. The non-linear components are hardware simulated neurons which accept the encoded value to produce a distributed neural activity. The second spatially parallel matrix multiplication combines the distributed neural activity with the second set of factorized network weights called a decoder weight matrix to produce an output signal.

The implementation of digital circuits for evaluating neural engineering framework style neural networks generally includes three steps:
 i. Producing an encoded value using a first set of spatially parallel matrix multiplication.
 ii. Producing distributed neural activity using a plurality of non-linear components.
 iii. Producing an output signal using a second set of spatially parallel matrix multiplication.

For producing an encoded value a given input signal injects current J into an ensemble of neurons by multiplying the input x with a gain $\alpha_i$ and the encoder $e_i$, then adding a bias term $J_i^{bias}$ according to the equation:

$$J = \alpha_i e_i x + J_i^{bias} \quad (1)$$

The distributed neural activity can be produced using a plurality of non-linear components. The non-linear transfer function emulates the behavior of a neuron. The neural activity has N elements, the input signal has $D_{in}$ elements, and the output signal has $D_{out}$ elements; all three of which are run-time parameters. The activity of a neuron can be calculated based on the input current, J, and a non-linear neuron model G, yielding the activity of each neuron $a_i$ as:

$$a_i = G[J] \quad (2)$$

The output signal is produced by a second set of spatially parallel matrix multiplication or a decoder with a combination of distributed neural activity. The decoders $d^{f(x)}$ can be used to estimate $f(x)$ given the activity a of an ensemble of neurons. The output signal, y, is a linear sum:

$$y = \hat{f}(x) = \sum_i a_i d_i^{f(x)} \quad (3)$$

The input signal x [1] is depicted as having dimensionality $D_{in}=3$, there are N=8 neurons depicted contributing to the neural activity representation [5], and the output signal y[7] is depicted with dimensionality $D_{out}=3$. In the present invention a scaled encoder weight matrix e' can be stored to save memory instead of storing gain $\alpha$ and the encoder separately. The so-called scaled encoders e' are defined according to the equation:

$$J = e_i' x + J_i^{bias} \quad (4)$$

In some cases, the bias term in Equation (4) is left as a separate memory structure and an adder stage is required before the non-linear neural transfer function. In some cases the bias term can be combined with the first matrix multiply by appending the bias vector $J^{bias}$ to the scaled encoder matrix weight e' and appending an associated 1 to the input signal x. The bias term included in the matrix multiplication, the augmented input x* and the augmented scaled encoders e'* are used to calculate the input current J according to the equation:

$$J = e_i'^* x^* \quad (5)$$

The input signal x [1] is multiplied with the factorized scaled encoder weight matrix $e_i'$ [2] with the first matrix multiplier [3] to produce the input current J for the neurons [4] as outlined in Equation (4). Next, the current J is injected into a neuron model [4] according to Equation (2) to produce the neural activity a [5]. In this embodiment, G is a simple Rectified Linear Unit defined by the equation:

$$a_i = \max(J, 0) \quad (6)$$

The neural activity a [5] is then multiplied by the linear decoder weights $d^{f(x)}$ [8] to produce the output signal y [7] according to Equation (3).

Figure 2:
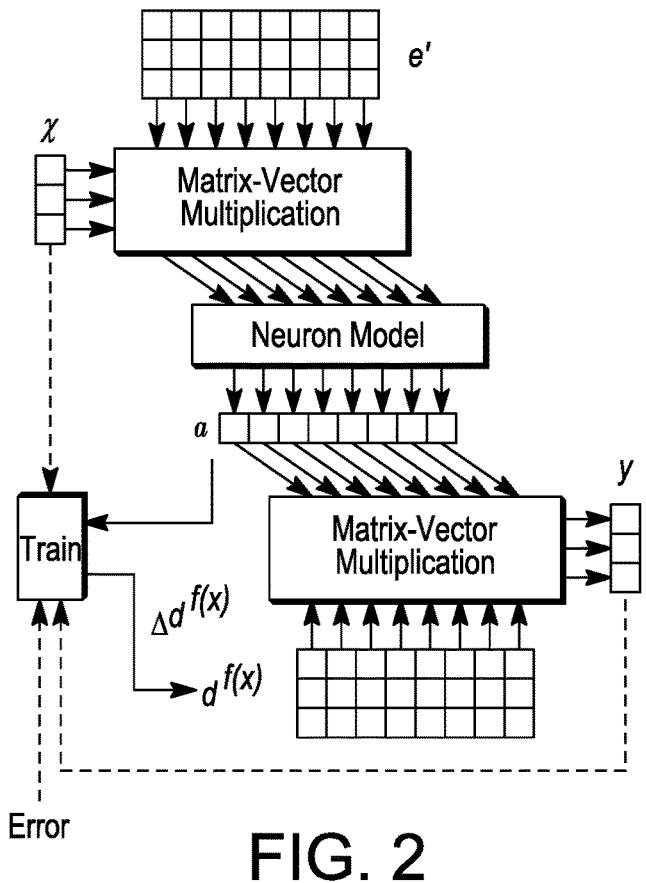
FIG. 2 shows the dataflow of digital circuits for evaluating neural engineering framework style neural networks including online training.

FIG. 2 shows the dataflow of digital circuits for evaluating neural engineering framework style neural networks including online training. Online training is performed by accepting the neural activity a and an error signal and using these to generate an update for the decoder weights $d^{f(x)}$. The update to the decoder weight matrix is calculated using a learning rule such as the Prescribed Error Sensitivity (PES) rule which generates the update according to:

$$\Delta d^{f(x)} = -k E^{f(x)} a \quad (7)$$

In Equation (7), $\Delta d^{f(x)}$ is the prescribed update for the decoder weights $d^{f(x)}$, k is a scalar learning rate, $E^{f(x)}$ is the error signal targeting the function $f(x)$, and a is the vector of all neural activities. The scalar learning rate k in the present invention is included as a run-time parameter. The error signal $E^{f(x)}$ may be calculated on chip, for example $d^{f(x)} = f(x) - y$, or may be provided wholly, or in part, by an external error signal. The evaluation of an NEF ensemble described herein may also be partitioned and distributed across circuits for evaluation in parallel. In some cases the parallel circuits reside on a single device and in some cases the parallel circuits are distributed across multiple devices. The PES rule modifies the connection weights between populations of neurons to minimize an external error signal.

Figure 3:
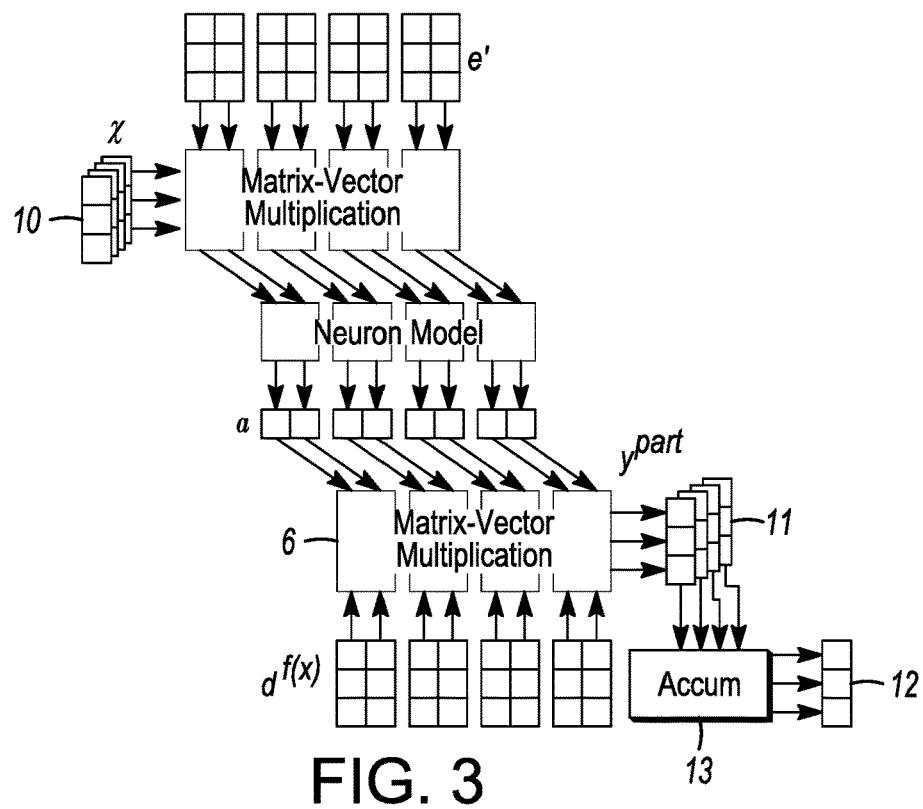
FIG. 3 shows a digital circuit in parallel, distributed execution.

FIG. 3 shows an examples of parallel, distributed execution. The scaled encoder weights e', neural activity a, and decoder weights $d^{f(x)}$ are simply partitioned. The input signal x must be replicated for each separate partition and similarly, each partition will produce a partial output signal $y^{part}$ [11] given their myopic weight access. These partial output signals $y^{part}$ must be accumulated by additional circuitry or logic to produce the single merged output signal y [12]. In some cases, this accumulation is implemented on the same device as the evaluation circuits and in some cases is implemented by an external system.

Figure 4:
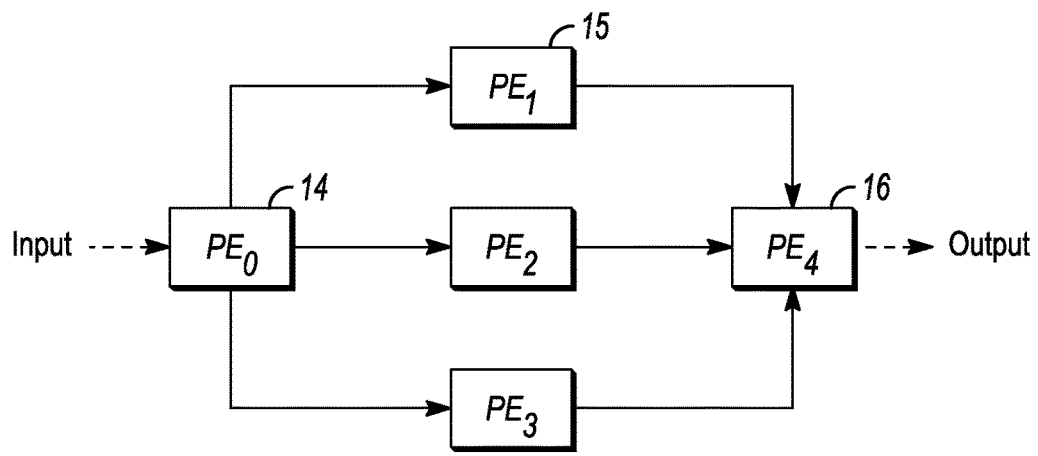
FIG. 4 shows multiple circuits connected in a larger system.

FIG. 4 shows an example of multiple circuits connected in a larger system. In the present invention multiple digital circuits evaluating separate neural ensembles may be connected in such a way to create a larger system. Single neural ensemble input circuits [14] are connected through mid or hidden circuits [15] to the output circuits [16]. Some circuits in the present invention can be implemented on a single device and some circuit can be implemented on multiple devices.

Figure 5:
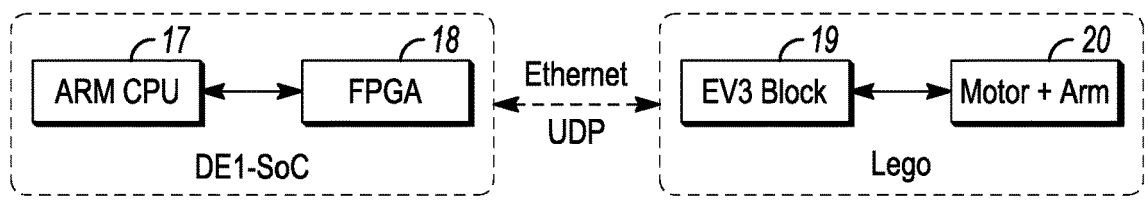
FIG. 5 shows an example implementation of a closed-loop PID controller.

FIG. 5 depicts an implementation of a closed-loop PID controller. The digital circuits in the present invention are implemented using an FPGA device to apply adaptive control to a physical inverted pendulum built using the Lego EV3 robotics platform. The FPGA device is a DE1-SoC FPGA device consisting of an Intel Cyclone V FPGA [18] paired with an on-chip ARM processor [17]. The physical inverted pendulum consists of a Lego EV3 block [19] connected to a single motor to which an arm is attached [20]. The goal is to balance the arm in a vertical upright position by applying torque to the motor. This system consists of one degree of freedom (i.e. single motor rotation).

The control system applied to the Lego pendulum consists of a PID controller wherein traditional PD control is implemented on the ARM processor and an adaptive ensemble of neurons using the digital circuits claimed herein is deployed on the FPGA to provide an adaptive I term. In this example the digital circuits evaluate N=1000 neurons with $D_{in}=D_{out}=1$ dimensions. The adaptive neurons allow the system to adapt to unknown dynamics in the system (e.g. friction or additional mass).

This example deploys a self-contained system wherein the DE1-SoC FPGA device communicates with the Lego EV3 block via a UDP socket. The Lego EV3 sends motor positions to the DE1-SoC where the PD controller on the ARM processor generates a control signal $u_{pd}$ given a target position (e.g. vertical). The PD controller also provides an error signal to the adaptive neural controller implemented using digital circuits on the FPGA. The neural ensemble updates the decoder weights based on the error signal and generates a control signal $u_i$. The two control signals are combined and $u=u_{pd}+u_i$ is sent to the Lego EV3 via UDP socket to update the motor torque.

This is a small example deployment of the digital circuits in the present invention. This same methodology integrating the present invention with surrounding systems can me scaled and applied to a variety of tasks including but not limited to adaptive motor control of larger systems with more degrees of freedom, image processing, or keyword spotting. Further, a development framework called Nengo™ FPGA is provided for the present invention wherein FPGA implementations are integrated with the Nengo neural network development ecosystem which allows easy deployment of applications using the digital circuits described herein.

The input signal and the output signal in the present invention are time-varying signals of arbitrary dimensionality. The encoder weights in the present invention are either randomly generated or explicitly set and are stored in the on-chip memory. The decoder weights which compute an arbitrary function are either analytically calculated or trained online and are stored in the on-chip memory. The input signal and the output signal interact with external systems in real-time.

The plurality of set of factorized network weight in the present invention are loaded upon initialization of digital circuits for evaluating neural engineering framework style neural networks. The initialization of loading on digital circuits for evaluating neural engineering framework style neural networks occurs once per application and it uses all subsequent cycles to consume the input signal and produce the output signal.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

We claim:

1. A digital circuit for evaluating neural engineering framework style neural networks comprising:
    at least one on-chip memory, an external system, an error signal, a plurality of sets of factorized network weights; wherein said plurality of set of factorized network weights further comprise a first set factorized network weights and a second set of factorized network weights, and an input signal;
    a first spatially parallel matrix multiplication; wherein said first spatially parallel matrix multiplication combines said input signal with said first set of factorized network weights defining an encoder weight matrix to produce an encoded value;
    a plurality of non-linear components; which accept said encoded value to produce a distributed neural activity;
    a second spatially parallel matrix multiplication; wherein said second spatially parallel matrix multiplication combines said distributed neural activity with said second set of factorized network weights defining a decoder weight matrix to produce an output signal.

2. The digital circuits for evaluating neural engineering framework style neural networks according to claim 1, wherein said input signal and said output signals are time-varying signals of arbitrary dimensionality.

3. The digital circuits for evaluating neural engineering framework style neural networks according to claim 1, wherein said encoder weight matrix is either randomly generated or explicitly set and are stored in said on-chip memory.

4. The digital circuits for evaluating neural engineering framework style neural networks according to claim 1, wherein said decoder weight matrix computes an arbitrary function and is either analytically calculated or trained online and stored in said on-chip memory.

5. The digital circuits for evaluating neural engineering framework style neural networks according to claim 1, wherein said input signal and said output signal interact with an external system in real-time.

6. The digital circuits for evaluating neural engineering framework style neural networks according to claim 1, wherein said neural activity has N elements, said input signal has $D^{in}$ elements, and said output signal has $D_{out}$ elements; all three of which are run-time parameters.

7. The digital circuits for evaluating neural engineering framework style neural networks according to claim 1, wherein said plurality of sets of factorized network weights are loaded upon initialization of digital circuits for evaluating neural engineering framework style neural networks.

8. The digital circuits for evaluating neural engineering framework style neural networks according to claim 7, wherein said initialization occurs once per application and said digital circuits for evaluating neural engineering framework style neural networks use all subsequent cycles to consume the input signal and produce the output signal.

9. The digital circuits for evaluating neural engineering framework style neural networks according to claim 1, wherein said decoder weights matrix may be trained online using said error signal scaled by said neural activity to produce an update to said decoder weight matrix.

10. The digital circuits for evaluating neural engineering framework style neural networks according to claim 1, wherein said error signal is produced by said external system which is calculated based on said input signal and said output signal.

11. The digital circuits for evaluating neural engineering framework style neural networks according to claim 1, wherein said external system are external circuits used to accumulate a partial part of said output signal.

\* \* \* \* \*